Patented June 12, 1928.

1,673,357

UNITED STATES PATENT OFFICE.

HENRY B. HANLEY, OF ROCHESTER, NEW YORK, ASSIGNOR TO WHITEHEAD BROTHERS COMPANY, OF NEW YORK, N. Y., A CORPORATION OF NEW JERSEY.

CORE BINDER.

No Drawing. Application filed October 13, 1924. Serial No. 743,493.

My invention relates to the art of metal founding and has for its object the treatment of dextrine or any other sticky flour made from cereal grains by a simple and inexpensive method whereby it will, in a measure, be insulated from moisture and will lose its great affinity for water thus making it particularly adapted for use as a binder for cores.

Dextrine and analogous substances, as are well known, readily absorb moisture so that if the core for which they act as a binder is not used immediately it will soften thus making is unsuitable for foundry work. After the dextrine or analogous material is treated according to my invention, however, it will either absorb no moisture, or it will absorb such a small amount of moisture as to not be disadvantageous when used in foundry practice.

The invention consists in adding oil, preferably mineral oil, to the dextrine and colloidizing the mixture, or in other words, disintegrating the mixture of the oil and dextrine into colloidal particles. In some cases water also may be added to the mixture before colloidization. The colloidization may be accomplished by means of a machine having a rotatable member adapted to rotate at high speed, a surface of which rotates in close and accurate relation to the surface of a stationary member, the mixture being forced through the space between the surfaces by the action of the rotatable member which in principle acts like a centrifugal pump whereby the oil and dextrine, and the water if used, when forced intermediate said surfaces will be minutely disrupted and dispersed and expelled as a colloidal mist. This action breaks down the dextrine and oil into colloidal particles whose dimensions are often one micron or less in diameter, causing said particles to intimately commingle or coalesce, whereby a thorough and lasting mixture of the two and a permanent emulsion will obtain. This action causes the dextrine to considerably lose its affinity for water, it being understood that other machines for effecting the desired result may also be used.

Before the mixture has been colloidized it may be desirable in some cases to add a stabilizer such as fish glue which stabilizer acts to assist in keeping the colloidal particles of the dextrine and oil in suspension.

For producing a suitable product I have found the following proportions of the various ingredients described to be efficacious:

|  | Per cent by weight. |
|---|---|
| Canary dextrine | 25 to 40 |
| Water | 69 to 47 |
| Fish glue | 1 to 3 |
| Mineral oil | 5 to 10 |

Canary dextrine is well known commercially although it will be understood that various other dextrines may be used. The mineral oil may be ordinary paraffin oil but in some cases it may be desirable to use a vegetable oil which would produce a stronger binder but which is more expensive.

It will be understood that it is within the scope of my invention in some cases to dispense with the colloidization of the dextrine and oil and to add to the mixture thereof, water and a clayey material similar to bentonite. This material may be found in the State of Wyoming and it contains a large percentage of silica and a comparatively large percentage of alumina, the balance thereof comprising ingredients of a low grade clay. The alumina and silica in the material combined as aluminum silicate is in free hydrated form in highly colloidal condition. Bentonite has a high dye test figure, of a minimum of 25,000 and a maximum of approximately 60,000 and also has a very high absorptive property. Because of these and other of its peculiar characteristics, when added to a mixture of dextrine and oil and water, it acts to cause the materials to remain mixed and stay in suspension.

When using the product just described the following proportions of the ingredients will produce favorable results:

|  | Per cent by weight. |
|---|---|
| Bentonite | 3 to 6 |
| Dextrine | 25 to 40 |
| Water | 67 to 44 |
| Oil | 5 to 10 |

What I claim as my invention is:

1. A core binder comprising a product made from cereal grains, oil and a stabilizer.

2. A core binder comprising a product made from cereal grains, oil, water and bentonite.

3. A core binder comprising dextrine, oil and bentonite.

4. A core binder comprising a product made from cereal grains, oil and a clayey material having a dye test figure of a minimum of 25,000 and a maximum of approximately 60,000.

5. A core binder comprising dextrine, oil, water and a stabilizer.

Signed at Rochester, in the county of Monroe and State of New York, this 22nd day of September, A. D. 1924.

HENRY B. HANLEY.